US006546433B1

(12) United States Patent
Matheson (10) Patent No.: US 6,546,433 B1
(45) Date of Patent: *Apr. 8, 2003

(54) METHOD AND SYSTEM FOR INTEGRATING EXTERNAL FUNCTIONS INTO AN APPLICATION ENVIRONMENT

(75) Inventor: Richard J. Matheson, Lindon, UT (US)

(73) Assignee: Novell, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/491,963

(22) Filed: Jan. 27, 2000

Related U.S. Application Data

(63) Continuation of application No. 08/833,592, filed on Apr. 7, 1997, now Pat. No. 6,138,170.

(51) Int. Cl.[7] .................................................. G06F 9/00
(52) U.S. Cl. ..................................................... 709/318
(58) Field of Search ................................. 717/100–113; 709/310–320

(56) References Cited

U.S. PATENT DOCUMENTS 6,083,282 A * 7/2000 Caron et al. ................... 717/6

OTHER PUBLICATIONS

Premia Corporation, *Codewright Programmers Reference Manual* cover. p. ii, and pp. 1–48, Jul. 1994.
Novell, Inc. *InForms Designer*, cover, copyright page pp. 41–66, 185–197, 1995.
Microsoft Corp. Web Pages: The Component Object Model Web Page; COM Objects and Interfaces; Interfaces and Interface Implementations; Interface Pointers and Interfaces; Iunknown and Interface Definition Inheritance; Designing COM Interfaces, Internet, Date Unknown.

(no author given) "PowerBuilder 5.0 Project Primer Manual," Powersoft, pp. 40–45, 52–57, 63–66, 105–108, 166–171, May 1996.

North, Ken, "Database Programming with OLE and ActiveX," DBMS, pp(8). Nov. 1996.

North, Ken, "Understanding OLE: Microsoft's language–independent, binary standard for object sharing on desktops and across networks," DBMS, v8, n7. p50(7), Jun. 1995.

(no author given) "COM–COBRA Interworking RFP Joint Part A Submission" OMG TC Document 95–8–8, pp. 1–61. Aug. 1995.

(no author given) "PowerBuilder 5 Unleashed," Sams Publishing, pp. 711, 721–725, 982, 983, 1075–1079, 1996.

* cited by examiner

Primary Examiner—St. John Courtenay, III
(74) Attorney, Agent, or Firm—Dinsmore & Shohl LLP (57) ABSTRACT

A method and system for integrating external functions into an application environment. The system includes an application environment, and a predetermined interface for communicating with an external function library. External functions offered by the external function library are integrated into the application environment such that they can be used in a formula as if they were native functions. According to another embodiment, an application environment is provided which implements pass by asynchronous-access-mechanism variables, and enables an external function to have access to a user interface object after the function has returned from an invocation.

13 Claims, 6 Drawing Sheets

METHOD AND SYSTEM FOR INTEGRATING EXTERNAL FUNCTIONS INTO AN APPLICATION ENVIRONMENT

This application is a continuation of application Ser. No. 08/833,592, filed Apr. 7, 1997, now U.S. Pat. No. 6,138,170.

FIELD OF THE INVENTION

This invention relates generally to application environments which include an application editing environment and an application execution environment, and more particularly relates to a method and system for integrating external functions, in a seamless manner, into such an application environment.

BACKGROUND OF THE INVENTION

Graphical application environments are becoming increasingly popular. An application environment typically includes an editing environment, which is used to create and modify an application, and an execution environment, which is used to run the application created in the editing environment. Examples of graphical application environments include database application environments which are used to create and execute front-end applications for querying and/or updating a database, and forms application environments which are used to create and execute forms applications for inputting and outputting data.

To simplify the creation of the user interface of the application, application environments typically allow drag-and-drop selection of the various user interface components (sometimes referred to as "objects"), such as text fields, radio buttons and checkboxes. To implement functionality in the user interface, the application environment provides a formula command language. The application developer can write a formula with the formula command language and specify that when the application is running in the application execution environment, the formula be executed upon the occurrence of a certain event, such as when a particular field obtains focus, or loses focus. The formula command language typically has a relatively simple syntax, and frequently includes the ability to invoke functions which provide certain predefined functionality, such as, for example, a Logarithm function for calculating logarithms, or a String-Compare function for comparing two strings. Thus, the overall functionality provided by the command language is in part dependent upon the number and type of functions which can be invoked from a formula.

For example, a particular input field of an application may require a user to enter a valid date. The developer of the application can write a formula which will be executed when a user tabs out of (i.e., the cursor is moved from) the input field, and which determines whether the data entered by the user is a valid date. To determine if the data constitutes a valid date, the formula may invoke a date function which accepts a string in 'mm/dd/yy' format, and which returns true if the string contains a valid date, and false if it does not. If the user-entered data is not a valid date, the formula could display a message, sound a beep, and/or prevent the user from leaving the input field.

Even from the relatively simple example presented, it is apparent that the variety and power of the functions which can be invoked in a formula play an important role in the overall functionality that an application can provide. Most application environments provide a predetermined set of functions for use in their environment (referred to herein as "native functions"), and additional functions are provided only when new versions of the application environment are released. The inability to easily integrate add-on functions to an existing release inhibits the vendor of the application environment and third-party providers from providing functions which can exploit niche markets, or meet new demands required by rapidly changing environments.

Although some application environments do allow invocation of functions which are external to the application environment, the external functions must be invoked in a manner which is different from invoking native functions, and the developer must understand and be aware of these differences, increasing the difficulty of using external functions. While application environments provide online help for native functions, such as a list of function arguments, no such help is provided for external functions. In general, there is no effort to integrate the external functions into the application environment such that they appear, to an application developer, to be native functions.

For example, in the NOVELL® INFORMS® forms application environment, a developer can invoke external functions, but InForms provides no mechanism for integrating an external function into the application environment such that the developer can determine the names of available external functions, the functionality which is provided, or the parameters which the function requires. Thus, to use an external function, the developer must know the name of the external function library, the name of the function, and the parameters required by the function.

Another disadvantage of conventional application environments is their inability to verify that a formula which invokes an external function is syntactically correct. Because the external functions are not integrated into the application environment, any calls to the external functions cannot be checked to ensure that the correct number and correct types of parameters are being passed. If the function call is not syntactically correct, the external function will not be able to provide the desired functionality, resulting in the application working incorrectly, or possibly even terminating unexpectedly when the function is invoked. The inability to verify, during development, that the call to the external function is syntactically correct can decrease a developer's desire to use external functions.

Yet another problem with the use of external functions in conventional application environments is that an external function can affect the value of a user interface object, such as a text field, only during the invocation of that function. That is, the data associated with a particular user interface object which are passed to a function can be changed by the function only during the invocation of the function, and once the function returns, the function can no longer affect the data. It would frequently be helpful if a developer could establish a continuous 'binding' or 'tie' between a user interface object and a particular function, such that the data associated with an object in the user interface could be continually monitored by the function.

It is apparent that an application environment that can integrate external functions into the environment such that they are as easy for a developer to use as are native functions, which can perform syntax checking of external function calls, and which can bind a user interface object to an external function even after a call to the external function has returned would be highly desirable.

SUMMARY OF THE INVENTION

It is one object of this invention to provide a method and system for integrating external functions into an application environment.

It is another object of this invention to provide an application environment which can syntax check calls to external functions.

It is yet another object of this invention to provide an application environment which, upon request, displays the function signature of external functions which have been integrated into the application environment.

It is still another object of this invention to provide a method and system which simplify the development of external functions for use in an application environment.

It is still another object of this invention to provide an application environment which, upon request, can provide help information about external functions which have been integrated into the application environment.

It is yet another object of this invention to provide a method and system for binding a user interface object to an external function for a period of time greater than the function invocation call.

Additional objects, advantages and other novel features of the invention will be set forth in part in the description that follows and, in part, will become apparent to those skilled in the art upon examination of the invention.

To achieve the foregoing and other objects and in accordance with the purposes of the present invention as described above, a method and system are provided for integrating external functions into an application environment. The system includes a client module which has a predetermined interface and is operative to interact with one or more different external function modules which have the predetermined interface. The client module communicates with the external function module via the predetermined interface, and determines which external functions are provided by the external function module. The external function module communicates attributes of the functions, such as function prototypes of the available external functions, to the client module. The client module maintains the attributes in a symbol table for use in displaying function name and parameter information to a developer, and for syntax checking.

The client module is a component of an editing environment, and the editing environment is operative to communicate the attributes of the external functions in the symbol table, such as the function name, parameters and a brief description of the function, to a developer using the editing environment. From these displayed attributes, the developer can incorporate a call to an external function into a formula which is associated with a user interface component, or object, in the application being developed. Through the use of the function attributes in the symbol table, the editing environment can determine if the function invocation of the external function is syntactically correct. If the syntax of the function call is incorrect, for example, the wrong number or types of parameters are being passed to the external function, the editing environment can return a syntax error alerting the developer to the syntax problem.

According to one embodiment of this invention, the predetermined interface includes the external function module having a registration function which can be invoked by the client module. The client module passes an enumeration function to the registration function of the external function module. The external function module calls the enumeration function once for each external function offered by the external function module, and includes in the call function prototype information and short help information. The external function module also preferably has a help function which the client module can invoke upon request by a developer for help information regarding an external function. The help function can return information explaining the usage and providing examples of a particular external function offered by the external function module. The client module can display this information to a developer of the editing environment.

According to another embodiment of this invention, parameters to external functions can be defined as pass by asynchronous-access-mechanism (AAM). An AAM variable is used when an external function must have access to the variable even after the call to the external function has returned. An execution module of the application environment includes an Asynchronous Event Manager (AEM) which maintains AAM variables, and creates the binding between a particular user interface component, or object, and the respective external function. By binding the data in a user interface component to an AAM variable, the data can be continually updated without requiring interaction by the user.

The method and system according to this invention enable the integration of external functions into an application environment in a seamless manner such that the external functions appear to be native functions to the application environment. Thus, a vendor of an application environment can provide additional functions for use in the application environment without having to wait for a new release of the application environment. Third party developers can also enhance an application environment by providing packages of external functions to users of the application environment. New needs can be quickly met with new functions without having to wait for or rely upon the vendor of the application environment.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principals of the invention. In the drawings.

DETAILED DESCRIPTION

Reference will now be made in detail to preferred embodiments of the invention, examples of which are illustrated in the accompanying drawings, wherein like numerals indicate the same elements throughout the views.

Figure 1:
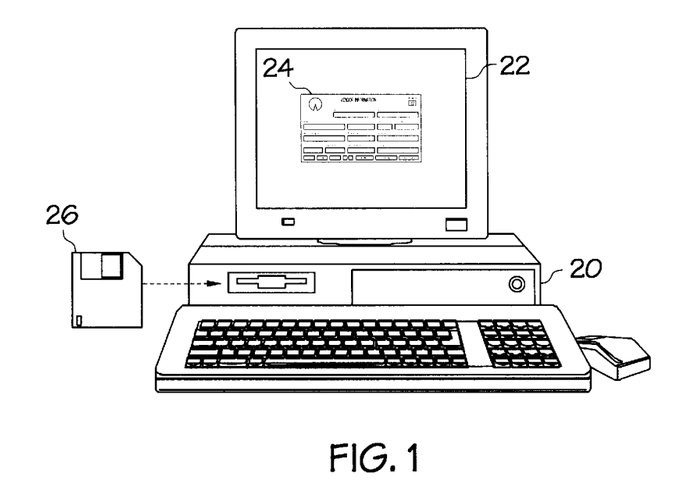
FIG. 1 is a schematic diagram of a computer environment in which the present invention can be carried out.

Referring to FIG. 1, the system and method of the present invention can be carried out on computer 20, which can comprise a conventional computer running a conventional operating system, such as MICROSOFT WINDOWS, OS/2, or UNIX, and having conventional components such as random access memory (RAM), one or more read-only memories (ROMs), and other components typically used in a conventional computer. Application environment 22 comprises an editing environment and an execution environment Application 24 is an example of an application developed in application environment 22.

The method and system according to this invention can be embodied as an article of manufacture by configuring the method and system as a program on storage device 26, or other persistent storage media According to another embodiment of this invention, the system is embodied as a special purpose apparatus by storing executable instructions suitable for carrying out the invention in a RAM or ROM, or a combination of both, in computer 20.

Figure 2:
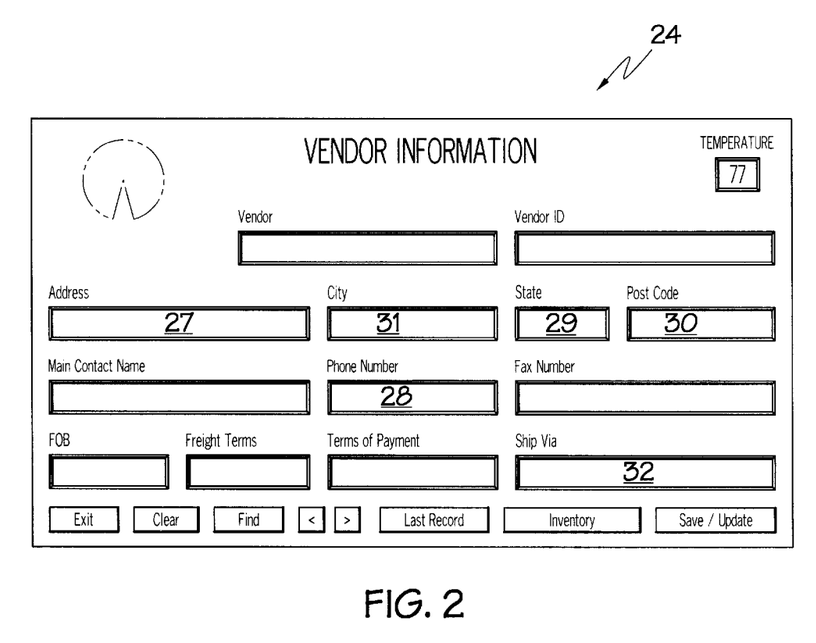
FIG. 2 shows a window with several user interface components of an application developed in an application environment utilizing the present invention.

FIG. 2 shows the user interface of application 24. In the embodiment illustrated herein, application environment 22 is a forms generation application environment; however, it is apparent that the invention has utility in any type of application environment which offers a command, or scripting language which includes the ability to invoke functions. Examples of such application environments are NOVELL INFORMS, JETFORM's forms product, and SYMANTEC's FormFlow product.

Application 24 includes various user interface components, or objects, such as field 29 in which a user of application 24 enters a state code, and field 28 in which a user enters a phone number. As an example of the use of a function, a developer of application 24 can use the formula command language of application environment 22 to create a formula which, when executed, invokes a function which determines what postal code is associated with a particular address. The formula can be specified to be executed when field 29 loses focus (i.e., when the cursor leaves field 29), at which time a GetPostalCode function is invoked. The parameters passed to the GetPostalCode function can be the address data from field 27, the city data from field 31, and the state data from field 29. The GetPostalCode function could utilize this information and access a file, or database, containing postal codes sorted by street addresses. The GetPostalCode function could then return the appropriate postal code and insert the postal code in field 30. In practice, as the user tabs from field 29 to field 30, the postal code would immediately appear in field 30, eliminating the need for the user to enter the postal code, and eliminating the possibility that the user could enter the wrong postal code information. If no postal code is available for the given address, city, and state, the formula can display an error message indicating an error in a particular field.

Another example of the use of a function might be with respect to field 28, where the user of application 24 enters a phone number. The developer of application 24 could create and associate a formula with field 28 which invokes a ValidatePhoneNumber function when field 28 loses focus. The phone number the user entered in field 28 would be passed to the ValidatePhoneNumber function, which ensures that a 10 digit number was entered, and that the area code and exchange are valid. If any of these conditions are not met, an error can be returned and an error message can be displayed to the user.

It is apparent that the capability of a formula command language to invoke functions greatly enhances the functionality which can be provided by application 24, and that the number and variety of available functions can distinguish one application environment over another. Typically, when an application environment is released, it contains certain native functions which can be used in formulas. However, conventional application environments either do not allow additional (referred to herein as "external") functions to be used with the application environment, or only allow the use of such external functions in a very limited manner. For example, if application environment 22 did not contain a ValidatePhoneNumber function, and did not allow the use of external functions, a developer must either choose another application environment, or attempt to use the formula command language to implement rudimentary phone number validation functionality. Even in conventional application environments which do allow the invocation of external functions, the application environment does not integrate the external functions such that the developer can easily determine what external functions are available. Thus, the developer must be aware of what external functions are available and understand precisely how to invoke such external functions, without any help from the application environment.

Another significant problem associated with the lack of integration between an application environment and external functions is the inability of the application environment to syntax check calls to the external functions. Because the application environment is unaware of the number and types of parameters which the external function expects, it is unable to determine if a formula is invoking an external function properly. Thus, it is only during the actual execution of the formula, in the run-time execution environment, that any problems with the function invocation will be uncovered. Such run-time validation can result in erroneous data, and/or termination of the application.

The method and system according to one embodiment of this invention provides a mechanism for integrating external functions into an application environment such that the external functions appear as native functions. A developer can determine, in the application environment, what external functions are available, and the function prototype of each external function. Further, upon request, the application environment can return more detailed help information about the external functions. The application environment can also syntax check calls to the external functions, and notify the developer of any syntax problems.

Figure 3:
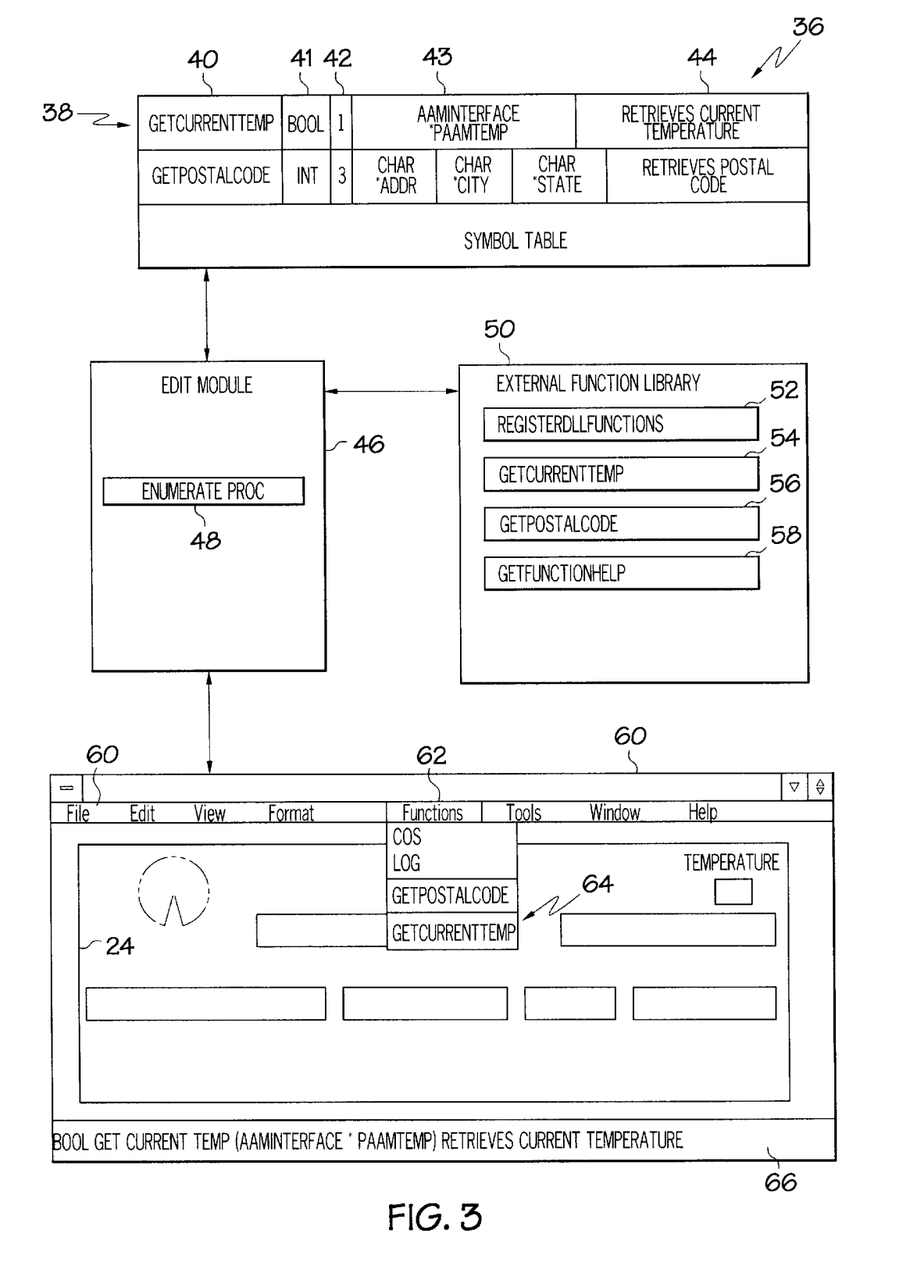
FIG. 3 is a block diagram illustrating various modules of an editing environment according to one embodiment of this invention.

FIG. 3 is a block diagram illustrating an editing environment according to one embodiment of this invention. A client module such as edit module 46 contains the functionality necessary to establish an editing environment in which an application, such as application 24, can be developed.

Window 60 shows an example of a user interface of the editing environment which a developer uses to develop an application, such as application 24. It is apparent that window 60 is a relatively simple example of a user interface in such an editing environment, and that the user interface of a full-featured editing environment would likely include multiple windows. According to one embodiment of this invention, to begin the integration of external functions into the editing environment, the developer first selects an Open External Function Library menu item (not shown) from File menu 60. Edit module 46 then scans the appropriate disk drive for external function modules, such as libraries, for example by searching for files with a particular extension such as ".dll". Edit module 46 presents to the developer a dialog box containing a list of the external function libraries it finds, and the developer can select one of the external function libraries in the list, such as external function library 50, via a user selection device, such as a mouse.

Although the external function module will be referred to as a library, such as a dynamic link library in the Microsoft Windows environment, it is apparent that the external function module could take any form which allows an external process, such as edit module 46, access to functions within the external function module at run-time.

To integrate the external functions of an external function library into the application environment, a predetermined interface exists between edit module 46 and external function library 50. The predetermined interface can comprise both edit module 46 and external function library 50 containing certain functions having predetermined function prototypes, or signatures, such that edit module 46 and external function library 50 can communicate with each other. According to one embodiment of this invention, the predetermined interface includes external function library 50 containing the following functions:

RegisterDLLFunctions—identifies external function library 50 as supporting the function registration protocol. This function, when invoked, communicates information about each external function it wishes to register by calling the EnumerateProc function, discussed below, which is passed as a parameter to RegisterDLLFunctions.

GetFunctionHelp—upon request, passes edit module 46 help information relating to a particular external function which can be displayed as part of the on-line help system of edit module 46. The name of the external function for which help is needed is passed as a parameter to GetFunctionHelp. Edit module 46 contains the following function for invocation by external function library 50.

EnumerateProc—invoked during registration by external function library 50 to provide information identifying the external functions offered by external function library 50. The information passed to edit module 46 identifies the external function library, and for each available external function specifies the function signature, or prototype (e.g. return type, calling convention, function name, parameter list and type information), as well as short form help information. Edit module 46 stores this information in symbol table 36, preserving the information for use in validating and executing calls by application 24 to the respective external functions.

An example of one syntax for passing the function signature of an external function to edit module 46 is to pass a string containing the function prototype information in the following format: (<return type>, <calling convention>, <function name>, (<parameter list>), <short help info>). For example, the string used to register an external function which obtains the current temperature may appear as "BOOL PASCAL GetCurrentTemp (AAMINTERFACE *paamTemp) Retrieves current temperature". The function signature information contained in this string will be parsed by edit module 46 and stored in symbol table 36. By parsing, it is meant that the various components of the string are separated from each other and stored in symbol table 36 for later use. For example, row 38 contains the symbol table information of the GetCurrentTemp function. Field 40 contains the name of the external function, field 41 contains the return type of the external function, field 42 contains a number which indicates the number of parameters required by the GetCurrentTemp function. Field 43 contains the only parameter required by the GetCurrentTemp function, a pointer to an integer. Field 44 contains short help information which can be displayed in window 60 to concisely describe the functionality provided by the GetCurrentTemp function.

According to another embodiment of this invention, a developer can request additional help information regarding a particular external function, such as by pressing the F1 function key while the name of the external function is highlighted. Edit module 46 can invoke GetFunctionHelp 58 in external function library 50 to obtain a detailed block of help information regarding the external information. This help information can then be displayed by edit module 46 to the developer.

After edit module 46 has parsed the strings containing the external function prototypes and loaded symbol table 36 with such information, edit module 46 preferably makes the names of the external functions available to the developer. For example, edit module 46 can add the names of the external functions to a function menu viewable by a developer using the editing environment. As seen in window 60, Function menu 62 contains a list of functions which are native to the application environment, such as the "COS" (cosine) and "LOG" (logarithm) functions, as well as the external functions which have been integrated into the application environment such as the "GetPostalCode" external function and the "GetCurrentTemp" external function. As a developer highlights a particular function name, such as at Function menu item 64, edit module 46 preferably displays the function prototype information and a brief description of the function in message area 66, allowing a developer to quickly ascertain what the function does, and what is required to invoke the function from a formula.

According to one embodiment of this invention, the allowable values for the various components of the function prototype information are as follows. <Return type> may be any base type in the C language, such as int, long, char, float, and double. The <calling convention> may be either PASCAL or CDECL. The <function name> is the name of the external function being called. External functions are preferably not compiled as C++ entry points, since this would make referencing a function by name impossible across compiler implementations. The <parameter list> can be C base types. Arguments can be passed by value, by reference, or by asynchronous access mechanism (AAM). Passing by AAM will be discussed in greater detail below.

Figure 4:
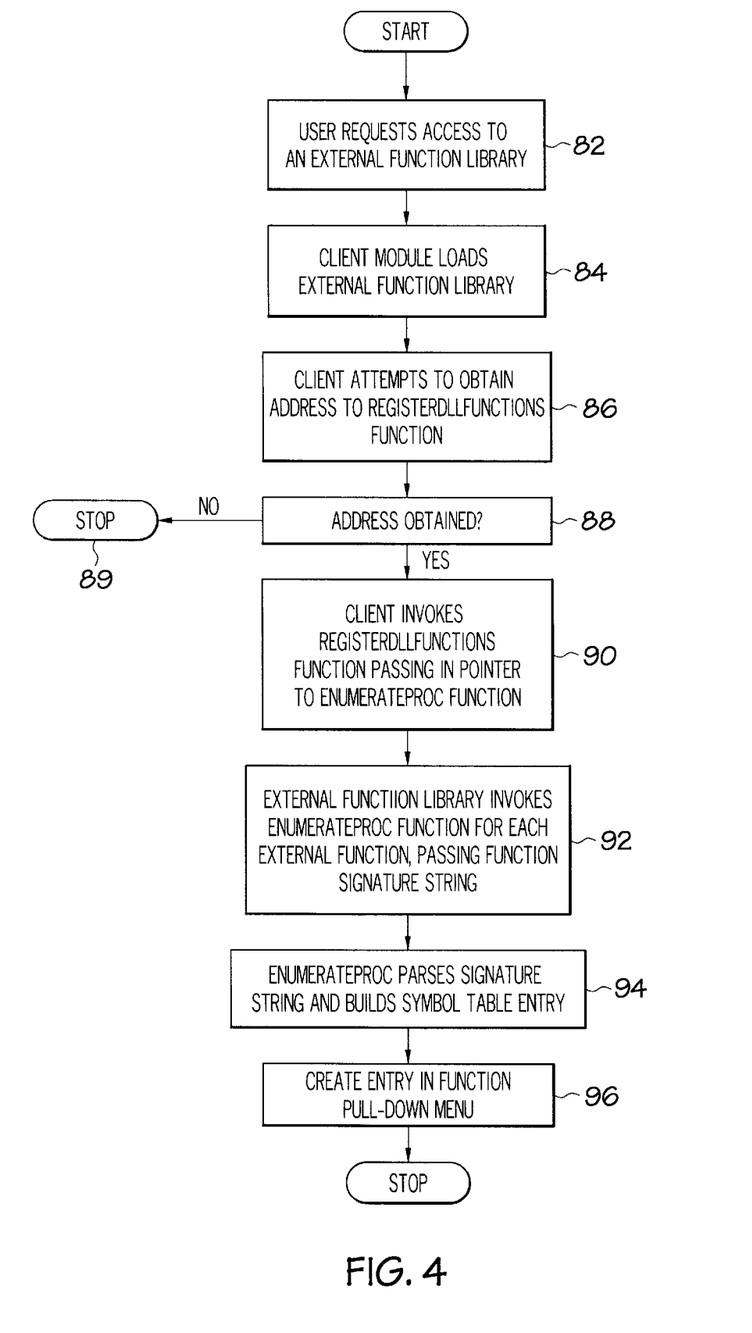
FIG. 4 is a flow diagram illustrating a process for establishing the editing environment shown in FIG. 3, according to one embodiment of this invention.

Referring now to FIG. 4, a method for integrating external functions into an application environment according to one embodiment of this invention is disclosed. FIG. 4 will be described with reference to FIG. 3 for purposes of clarity. At block 82, a developer selects a particular external function library to be integrated into the editing environment. At block 84, edit module 46 initiates the requested external function library, such as external function library 50, through the use of a system command suitable for invoking a library, such as the LoadLibrary function. At block 86, edit module 46 determines whether external function library 50 contains the RegisterDLLFunctions function. This can be determined through the use of a system function such as GetProcAddress. At block 88, if edit module 46 determines that the external function library does not contain the RegisterDLLFunctions function, then edit module 46 determines that this is not a suitable external function library and at block 89 stops.

According to one embodiment of this invention, even if the external function library does not contain a RegisterDLLFunctions function, a developer can still write formulas using functions from the external function library, but no syntax checking will be performed, nor will the pass-by-AAM mechanism be available. If the address to the RegisterDLLFunctions function was obtained, then at block 90, edit module 46 invokes RegisterDLLFunctions function 52 and passes to RegisterDLLFunctions function 52 a function pointer to the EnumerateProc function 48. At block.92, external function library 50 invokes EnumerateProc function 48 once for each external function contained in external function library 50. For each external function to be registered, RegisterDLLFunctions function 52 passes a string describing the function prototype of the respective external function. At block 94, edit module 46 parses the function prototype string and builds the respective entry in symbol table 36. At block 96, edit module 46 enters the name of the registered external function in Function menu 62 so the information relating to the registered external function can be easily accessed by a developer.

Although a particular predetermined interface between edit module 46 and external function library 50 has been discussed for purposes of illustration, it is apparent that the interface could differ substantially from the interface shown, and remain within the scope of the present invention. Suitable interfaces include those which enable edit module 46 and external function library 50 to communicate the relevant external function prototype information between the two modules.

Figure 5:
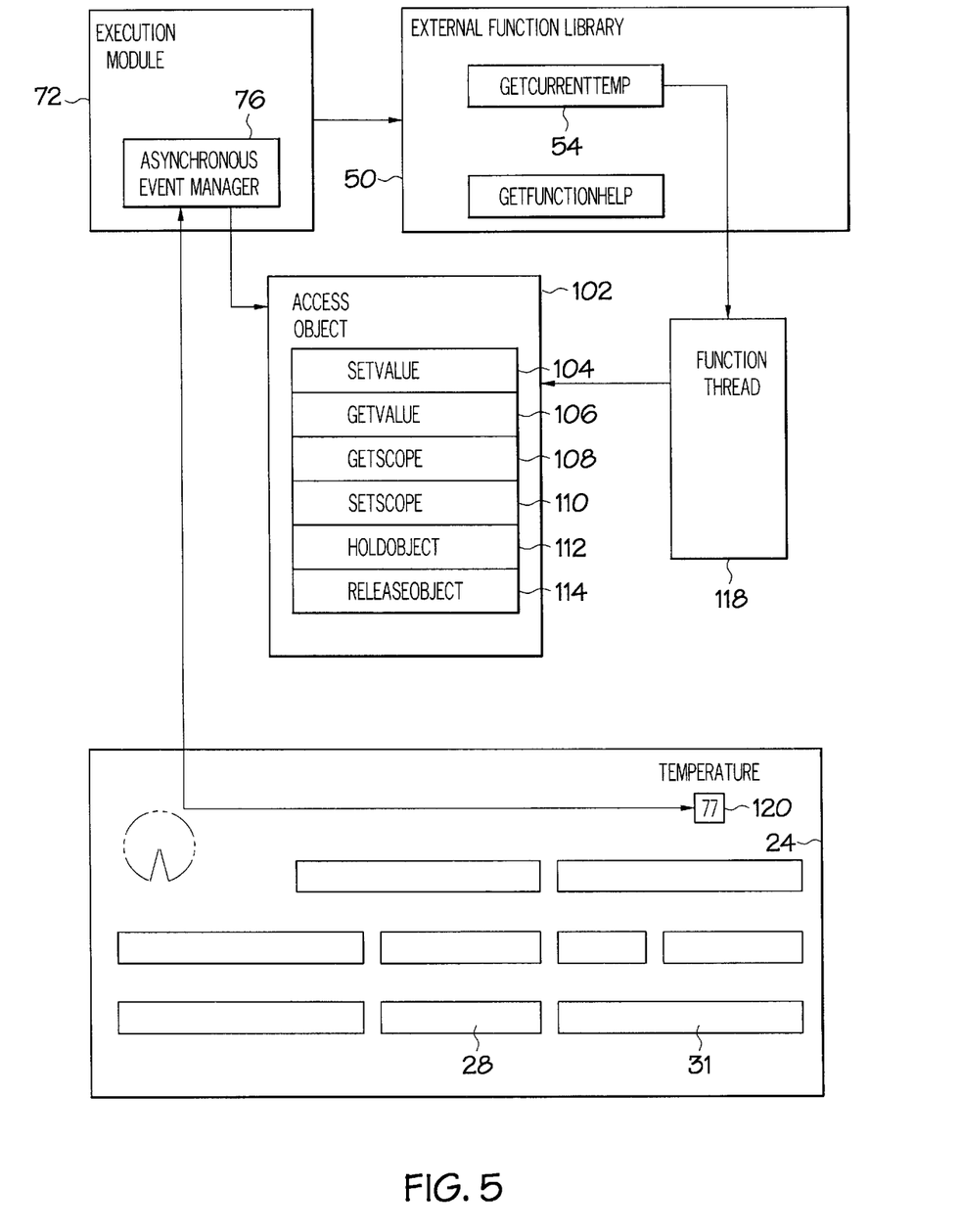
FIG. 5 is a block diagram illustrating various modules of an execution environment according to one embodiment of this invention.

The editing environment discussed above is used by a developer to create and/or modify an application, such as application 24. To run application 24, an execution environment is necessary which interprets the formulas in application 24 and invokes the appropriate functions, both native and external, and creates the binding between a particular user interface component, or object, in application 24 with a respective call to an external function. FIG. 5 shows an execution environment according to one embodiment of this invention. A client module such as execution module 72 is responsible for interpreting and executing the formulas associated with various objects in application 24. Although edit module 46 is shown in FIGS. 3 and 5 as being a different module from execution module 72, it is apparent that a single client module could provide functionality provided by the individual edit and execution modules 46, 72. When a user runs application 24, execution module 72 invokes the appropriate formulas associated with application 24 at the appropriate time. For example, a formula can be associated with a particular field such as field 28 such that when a user tabs from field 28 to field 33, a formula containing calls to native and/or external functions is executed to verify or validate the data contained within field 28.

The data in a particular user interface component, or object, such as field 28, can be passed as a parameter to a native or external function. Execution module 72 handles not only the interpretation and execution of formulas, and the invocation of functions within the formulas, but also binds any user interface objects used in a function call to the data returned by the function. In other words, execution module 72 will pass the data contained in a user interface object to a function, and after the function returns, compare the data that was returned by the function to the data that was passed to the function. If the data has changed, execution module 72 will update the user interface object with the new data. According to one embodiment of this invention, execution module 72 supports pass-by-value parameters, pass-by-reference parameters, and pass-by-asynchronous access mechanism (AAM) variables. Pass-by-value and pass-by-reference parameters are well known to those skilled in the art, as are methods to implement such variables in an application environment. In most programming languages, an invocation of a function can affect a variable passed to that function only during the life of the function call. A pass-by-AAM mechanism allows a user interface component, such as temperature field 120, to be exposed to an external function even after the external function has returned.

In order to implement pass-by-AAM variables, the application environment and external function must support a pass-by-AAM mechanism. According to one embodiment of this invention, execution module 72 achieves a pass-by-AAM mechanism with an asynchronous event manager (AEM). A parameter to an external function can be denoted as a pass-by-AAM variable, for example, by prefixing the variable with special characters, such as "&( )". For each pass-by-AAM variable, asynchronous event manager 76 instantiates an access mechanism object, such as access object 102. According to one embodiment of this invention, access object 102 preferably is a separate library, such as a dynamic link library (DLL). Access object 102 preferably contains six functions, or methods, as set forth below.

SetValue—this method is invoked by external function thread 118 and accepts a pointer to the value to be stored in the application interface object. The value is communicated by this method to execution module 72 via asynchronous event manager 76. Execution module 72 compares the value to the existing value in the object, and if different, updates the object with the new value.

GetValue—this method is invoked by external function thread 118 and returns a pointer to the value currently in the application interface object. This value is preferably cached in the AAM, with update operations being handled by the AEM managing this AAM.

GetScope—this methods is invoked by external function thread 118 and returns a BOOLEAN flag indicating whether or not the application interface object is still "in scope" and available for operation. If the application interface object is not in scope, external function thread 118 will release its hold on this AAM.

SetScope—this method is called by execution module 72 to maintain the scope of the application object. The scope can be set to TRUE or FALSE. Setting the scope to FALSE does not cause the AAM to clean up or unload, nor does it affect the reference count of the AAM. It does cause the AAM to return "out of scope" errors on methods invoked while the scope flag is FALSE.

HoldObject—this method is called by both execution module 72 and external function thread 118 to register themselves as requiring the services of the AAM.

ReleaseObject—this method is called by both execution module 72 and external function thread 118 to unregister their interest in the AAM. When the AAM's reference count reaches zero it may unload itself. Calling ReleaseObject also causes the scope flag to be set to FALSE.

For each pass-by-AAM parameter, execution module 72 passes to the external function a pointer to an AAMINTERFACE object. The precise mechanism for implementing an AAMINTERFACE object can differ across implementations, but, for example, can comprise a class definition with overloaded GetValue and SetValue methods for each type of variable supported, or can be a COM object with an OLE interface, and the GetValue and SetValue methods would interact with the OLE variant data type. OLE technology is known to those skilled in the art, and is described in detail in Inside OLE, second edition, by Kraig Brockschmidt, available from Microsoft Press, which is hereby incorporated herein by reference. For each pass-by-AAM parameter, external function library 50 preferably initiates a separate external function thread such as external function thread 118, which can communicate through method invocation with access object 102. In this way, even after the external function has returned, external function thread 118 maintains the ability to update the interface object in application 24 through access object 102.

An example can be described with reference to temperature field 120. To enable application 24 to continually display the current temperature in application 24, a developer could invoke GetCurrentTemp 54 with a pass-by-AAM variable which is associated with temperature field 120. Upon determining that the variable is a pass-by-AAM variable, asynchronous event manager 76 instantiates access object 102. Execution module 72 invokes the GetCurrentTemp function 54 in external function library 50, passing a pointer to an AAMINTERFACE object. GetCurrentTemp function 54 processes an external function thread 118 and returns. External function thread 118 can be run-time bound to access object 102 in various ways, such as via the Object Linking Embedding (OLE) binary standard. Access object 102 can be implemented as a COM object, for example.

External function thread 118 invokes SetValue method 104 and GetValue method 106 to set and retrieve, respectively, the value associated with field 120 in application 24. External function thread 118 calls GetScope method 108 to determine whether text field 120 is still "in scope". According to another embodiment of this invention, instead of using a GetScope method, GetValue method 106 and SetValue method 104 return status codes indicating whether or not text field 120 is in scope. If text field 120 is not in scope, external function thread 118 does not otherwise interact with access object 102.

Figure 6:
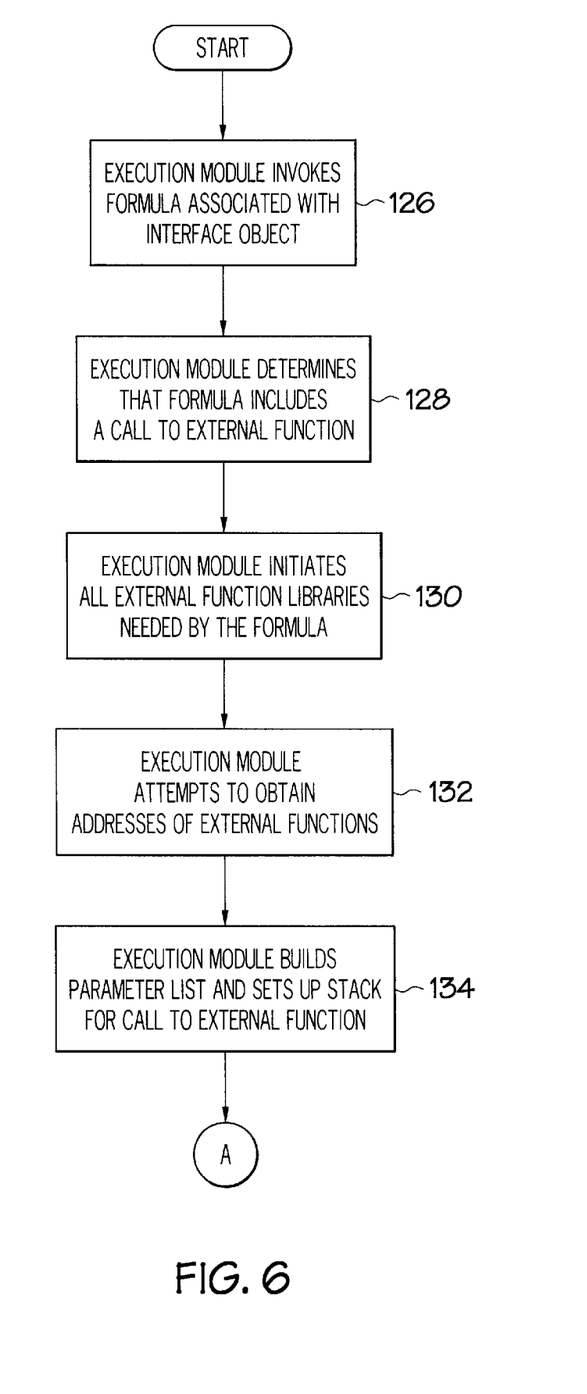
FIGS. 6 and 7 are flow diagrams illustrating a process for executing a formula containing an external function according to one embodiment of this invention.
Figure 7:
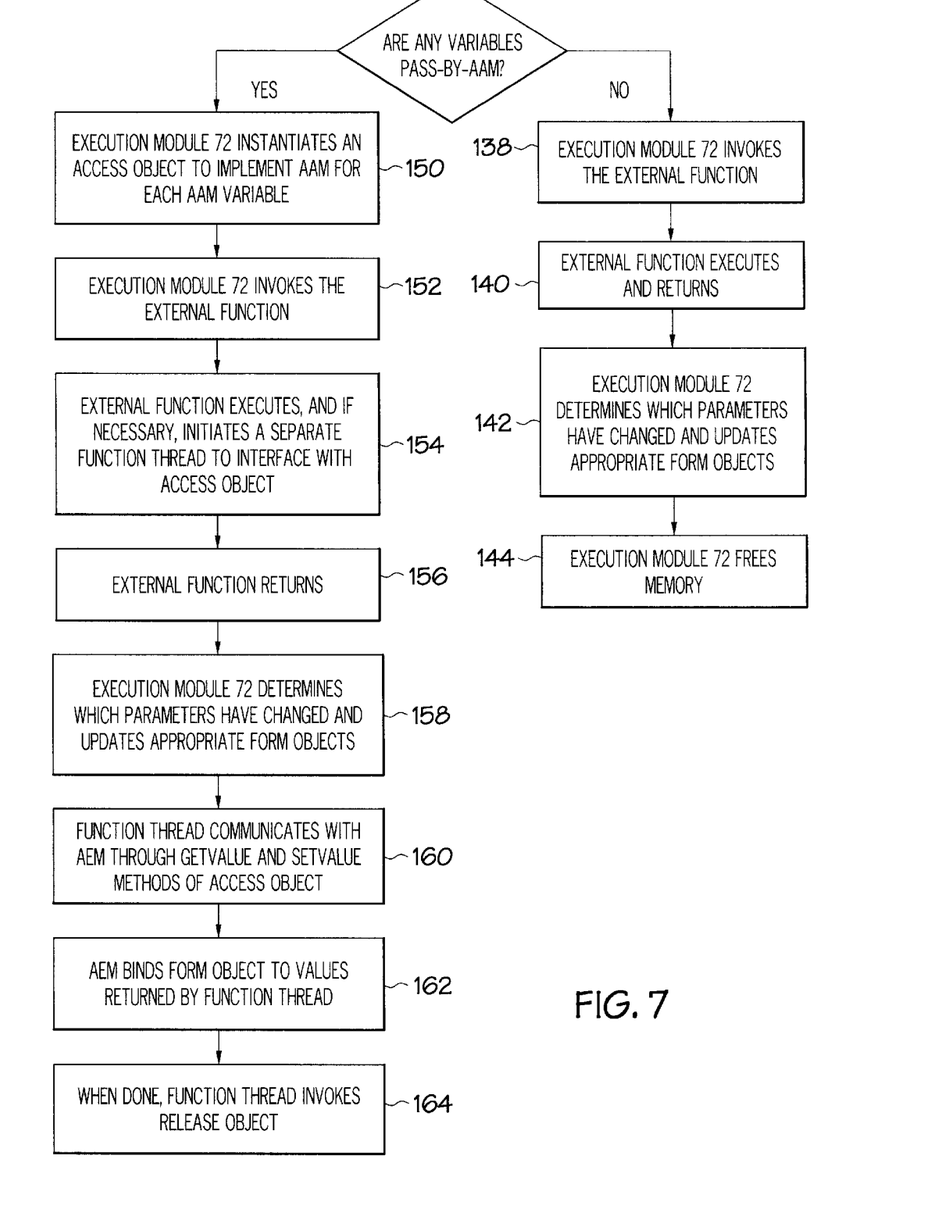

FIGS. 6 and 7 are flow diagrams illustrating the process by which execution module 72 interacts with external function library 50 and application 24, according to one embodiment of this invention. At block 126, execution module 72 executes a formula associated with field 120. At block 128 execution module 72 determines that the formula includes a call to GetCurrentTemp function 54 in external function library 50. At block 130, execution module 72 initiates external function library 50, whose name was stored as part of the formula by edit module 46, and at block 132 external module 72 attempts to obtain the address of GetCurrentTemp function 54. Obtaining a function address can be achieved through the use of conventional operating system functions, such as GetProcAddress, or other suitable system calls.

At block 134 execution module 72 builds the parameter list required for the call to GetCurrentTemp function 54, and sets up the stack in preparation for invoking GetCurrentTemp function 54. Because execution module 72 interprets formulas, the stack must be prepared dynamically prior to invoking GetCurrentTemp function 54, as is necessary with other interpretive languages. Mechanisms for preparing a stack at run time typically involve invoking a function written in assembly language which can manipulate a program's stack in preparation for a function call. Such functions and mechanisms for run-time manipulation of a stack are known to those skilled in the art. At block 136 execution module 72 determines whether any of the parameters passed to GetCurrentTemp 54 are pass-by-AAM parameters. If not, then at block 138 execution module 72 invokes the external function. At block 140 the external function returns and execution module 72 determines which parameters passed to the external function have changed, and updates the appropriate user interface objects in application 24 with any changed values. At block 144 execution module 72 frees any memory required to invoke the external function.

If, at block 136, a parameter is being passed-by-AAM, then at block 150 execution module 72 instantiates an access object, such as access object 102, for each pass-by-AAM parameter. At block 152, execution module 72 invokes GetCurrentTemp function 54. GetCurrentTemp function 54 executes and initiates a separate command thread, such as external function thread 118 to interface with access object 102. At block 156, GetCurrentTemp function 54 executes and returns. At block 158, execution module 72 determines which parameters have changed and updates the appropriate user interface objects, such as field 120, with the changed parameter. Even though GetCurrentTemp function 54 has returned, field 120 can still be updated and otherwise manipulated by external function thread 118 via access object 102 and asynchronous event manager 76. This allows an external function to be bound to an interface object in application 24 for the life of the interface object, rather than only during the life of the function invocation. At block 160, external function thread 118 communicates with asynchronous event manager 76 via access object 102. To change a value of text field 120, external function thread 118 invokes SetValue method 104. SetValue method 104 can then invoke one or more functions in asynchronous event manager 76 to notify it that external function thread 118 changed the value of text field 120. Asynchronous event manager 76 can then invoke GetValue method 106 to retrieve the updated value, and at block 162 changes field 120 with the new value. At block 164 execution module 72 invokes ReleaseObject method 114 to indicate that AEM 76 no longer requires access object 102. External function thread 118 likewise invokes ReleaseObject method 114 and access object 102 can terminate.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principals of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A system operative to integrate a plurality of external functions into an application environment, comprising:

a client module, the client module being a component of an editing environment in which an application can be developed, the client module having a predetermined interface that includes a predetermined function signature and being operative to bi-directionally interact with one or more different external function modules that have the predetermined interface that includes the predetermined function signature, such that attributes of at least one external function of an external function module can be provided from the external function module to the editing environment; and a first structure operative to retain a plurality of attributes of the at least one external function, wherein the editing environment is configured to communicate with the first structure and to display the attributes to a developer and wherein the editing environment is further configured to receive a function invocation provided by the developer and to use the attributes in the first structure to determine whether the function invocation is correct.

2. A system according to claim 1, wherein the predetermined interface comprises at least one registration function, the registration function being operative to receive the plurality of attributes of the external function, and to store the plurality of attributes into the first structure.

3. A system according to claim 1, wherein the client module is operative to signal the external function module for help information relating to the at least one external function, and to display the help information on a display device.

4. A system according to claim 1, wherein the client module further comprises an asynchronous event manager and an access object, the access object being coupled to a user interface object in the application environment via the asynchronous event manager, and the access object being operative to interact with the asynchronous event manager and the external function.

5. A system according to claim 4, wherein the access object is initiated in response to an invocation of the external function, and wherein the access object remains coupled to the user interface object after the external function returns to a calling process.

6. A system according to claim 1, further comprising an external function module having a plurality of external functions, and a display device, the client module being operative to display the name of each of the plurality of external functions in the external function module on the display device.

7. A method for integrating an external function into an application environment, the method comprising:

specifying an external function module having at least one external function;

initiating the specified external function module;

receiving a plurality of attributes of the at least one external function from the specified external function module;

storing the plurality of attributes in a symbol table;

retrieving at least one of the attributes from the symbol table;

using the at least one attribute to determine if a function invocation provided by a developer is correct; and if the function invocation is not correct, indicating an error condition.

8. A method according to claim 7, further comprising displaying one of the attributes of the at least one external function on a display device.

9. A method according to claim 7, further comprising the application environment receiving a command line referencing the at least one external function, and determining if the at least one external function is referenced in the command line according to the plurality of attributes of the at least one external function.

10. A method according to claim 7, further comprising invoking the at least one external function in an execution mode of a developed application, and associating a response of the at least one external function with a user interface object associated with the developed application.

11. A method according to claim 10, further comprising initiating an access object as a function of one of the plurality of attributes of the at least one external function, coupling the access object to the user interface object, and maintaining the coupling after the at least one external function returns from a calling process.

12. A method for integrating an external function into an application environment, the method comprising:

specifying an external function module having at least one external function;

initiating the specified external function module;

receiving a plurality of attributes of the at least one external function from the specified external function module;

storing the plurality of attributes in a symbol table;

invoking the at least one external function in an execution mode of a developed application;

associating a response of the at least one external function with a user interface object associated with the developed application;

initiating an access object as a function of one of the plurality of attributes of the at least one external function;

coupling the access object to the user interface object; and maintaining the coupling after the at least one external function returns from a calling process.

13. The method as recited in claim 12, wherein the at least one external function is operative to initiate a thread, the thread being operative to communicate with the access object.

* * * * *